(12) United States Patent
Jauer et al.

(10) Patent No.: US 8,709,596 B2
(45) Date of Patent: Apr. 29, 2014

(54) PRESSURE-SENSITIVE ADHESIVE COMPOSITION HAVING AN IMPROVED RELEASE BEHAVIOR

(75) Inventors: Stephan Jauer, Göttingen (DE); Marten Papenbroock, Hamburg (DE)

(73) Assignee: tesa SE, Hamburg (DE)

( * ) Notice: Subject to any disclaimer, the term of this patent is extended or adjusted under 35 U.S.C. 154(b) by 104 days.

(21) Appl. No.: 12/935,626

(22) PCT Filed: May 27, 2009

(86) PCT No.: PCT/EP2009/056412
§ 371 (c)(1),
(2), (4) Date: Nov. 4, 2010

(87) PCT Pub. No.: WO2009/150044
PCT Pub. Date: Dec. 17, 2009

(65) Prior Publication Data
US 2011/0129632 A1    Jun. 2, 2011

(30) Foreign Application Priority Data

Jun. 10, 2008   (DE) .......................... 10 2008 027 501

(51) Int. Cl.
*B32B 7/12* (2006.01)
*B32B 15/04* (2006.01)

(52) U.S. Cl.
USPC .................. 428/343; 428/354; 428/355 R

(58) Field of Classification Search
USPC ..................... 428/343, 355 R, 354
See application file for complete search history.

(56) References Cited

U.S. PATENT DOCUMENTS

| | | | |
|---|---|---|---|
| 4,576,999 A | 3/1986 | Eckberg | |
| 4,609,574 A * | 9/1986 | Keryk et al. ............... | 427/407.1 |
| 4,678,846 A | 7/1987 | Weitemeyer et al. | |
| 4,725,630 A | 2/1988 | Magee et al. | |
| 4,751,269 A * | 6/1988 | Bonk et al. ................ | 525/163 |
| 4,978,726 A | 12/1990 | Döhler et al. | |
| 5,744,557 A * | 4/1998 | McCormick et al. ......... | 526/171 |
| 5,767,210 A | 6/1998 | Lecomte et al. | |
| 5,789,487 A | 8/1998 | Matyjaszewski et al. | |
| 5,811,500 A | 9/1998 | Dubois et al. | |
| 5,817,426 A * | 10/1998 | Spada et al. ................. | 428/483 |
| 5,854,364 A | 12/1998 | Senninger et al. | |
| 5,945,491 A | 8/1999 | Matyjaszewski et al. | |
| 6,074,747 A | 6/2000 | Scholz et al. | |
| 6,114,482 A | 9/2000 | Senninger et al. | |
| 6,204,350 B1 | 3/2001 | Liu et al. | |
| 6,720,399 B2 | 4/2004 | Husemann et al. | |
| 6,765,078 B2 | 7/2004 | Husemann et al. | |
| 2002/0119292 A1 | 8/2002 | Venkatasanthanam et al. | |
| 2003/0049441 A1 | 3/2003 | Samukawa | |
| 2004/0092685 A1 | 5/2004 | Husemann et al. | |
| 2006/0020067 A1 | 1/2006 | Brant et al. | |

FOREIGN PATENT DOCUMENTS

| | | |
|---|---|---|
| DE | 33 16 166 C1 | 11/1983 |
| DE | 38 20 294 C1 | 10/1989 |
| DE | 600 01 779 T2 | 2/2004 |
| EP | 0 168 713 B1 | 9/1991 |
| EP | 0 824 110 A1 | 2/1998 |
| EP | 0 824 111 A1 | 2/1998 |
| EP | 0 826 698 A1 | 3/1998 |
| EP | 0 841 346 A1 | 5/1998 |
| EP | 0 850 957 A1 | 7/1998 |
| EP | 1 311 555 B1 | 5/2005 |
| JP | 01308413 A * | 12/1989 |
| WO | 2006/073920 A2 | 6/2006 |

OTHER PUBLICATIONS

Derwent Abstract of JP 01-308413. See above for date and inventor.*
R. Dittmeyer et al., "Chemische Technik, Prozesse und Produkte" Vo. 5, 5th edition, Wley-VCH, Weinheim, Germany, 2005, section 6-5. 3.2, pp. 1141-1145.
Fox equation (cf. T.G. Fox, Bull. Am. Phys. Soc. 1 (1956) 123).

* cited by examiner

*Primary Examiner* — Victor Chang
(74) *Attorney, Agent, or Firm* — Norris McLaughlin & Marcus PA

(57) ABSTRACT

Adhesive tape comprising at least one layer of an acrylate-based pressure-sensitive adhesive and a liner having a catalyzed addition crosslinking silicone coating, the silicone coating being in direct contact with the pressure-sensitive adhesive and the pressure-sensitive adhesive comprising additives that are effective as catalyst poisons.

9 Claims, No Drawings

PRESSURE-SENSITIVE ADHESIVE COMPOSITION HAVING AN IMPROVED RELEASE BEHAVIOR

This is a 371 of PCT/EP2009/056412 filed 27 May 2009 (international filing date).

The invention relates to acrylate-based pressure-sensitive adhesives with release force-regulating additions, and also to the use of release force-regulating compounds in a pressure-sensitive acrylate adhesive.

BACKGROUND OF THE INVENTION

Adhesive tapes coated with adhesives on one or both sides are normally wound up at the end of the production process to give a roll in the form of an Archimedean spiral. In order to prevent the pressure-sensitive adhesives (PSAs) coming into contact with one another in the case of double-sided adhesives tapes, or to prevent PSA sticking to the carrier in the case of single-sided adhesive tapes, the adhesive tapes prior to winding are applied to a liner material (also referred to as release material) which is wound up together with the adhesive tape. Liner materials, or release liners, of this kind are familiar to the skilled person. As well as for lining single-sided or double-sided adhesive tapes, liners are also employed for lining labels.

A liner (release paper, release film) is not part of an adhesive tape or label, but merely an auxiliary means in its production, storage or further processing by punching. Furthermore, in contrast to an adhesive-tape carrier, a liner is not firmly joined to a layer of adhesive.

Abhesive coating materials are in widespread use for the production of liners in the coating, in particular, of sheet materials such as papers or films, in order to reduce the adhesion tendency of adhering products relative to these surfaces.

When a double-sided adhesive tape furnished with a liner is unwound, it is normally adhered by its open—that is, liner-free—PSA side to a substrate. During this procedure, the other PSA side still adheres to the coated surface of the liner to a sufficient extent to allow handling of the adhesive tape.

However, the liner must be removable from the adhesive tape. The liner itself, or the removal of the liner, must not have a substantially detrimental effect on the bond strength of the PSA, for its subsequent use.

At the same time, the stability of the antiadhesive coating (also called release coating) on the liner, in other words the abhesiveness, over long time periods is important in order to ensure the function of this coating and also to ensure the properties of the PSA lined with the liner.

Crosslinkable silicone systems are frequently used for release coating. They include mixtures of crosslinking catalysts and what are called thermally curable condensation-crosslinking or addition-crosslinking polysiloxanes. For condensation-crosslinking silicone systems, tin compounds, such as dibutylin diacetate, are frequently present as crosslinking catalysts in the composition.

Silicone-based release coatings on an addition-crosslinking basis can be cured by hydrosilylation. These release systems typically comprise the following constituents: an alkenylated polydiorganosiloxane (in particular, linear polymers with terminal alkenyl groups), a polyorganohydrosiloxane crosslinking agent, and a hydrosilylation catalyst.

Catalysts which have become established for addition-crosslinking silicone systems (hydrosilylation catalysts) include, for example, platinum or compounds of platinum, such as the Karstedt catalyst [a Pt(0) complex], for example.

Moreover, it is also possible to use photoactive catalysts, known as photoinitiators, in combination with UV-curable, cationically crosslinking, epoxide- and/or vinyl ether-based siloxanes, or UV-curable, free-radically crosslinking siloxanes such as, for instance, acrylate-modified siloxanes. Also possible is the use of electron beam-curable silicone acrylates. Depending on their intended use, such systems may also include further additions such as stabilizers or flow control assistants.

Furthermore, there are various kinds of organopolysiloxane compositions known which crosslink by heating or irradiation. These include compositions of the kind described, for example, in DE 600 01 779 T2, which crosslink through addition reaction, namely through temperature treatment of a mixture of an organopolysiloxane having hydrogen atoms attached directly to the silicon atoms, and an organopolysiloxane having vinyl groups attached directly to the silicon atoms, in the presence of a hydrosilylation catalyst.

Photopolymerizable organopolysiloxane compositions can be used as well. These include, by way of example, compositions which are crosslinked through the reaction between organopolysiloxanes which have hydrocarbon radicals that are substituted by (meth)acrylate groups and are attached directly to the silicon atoms, and in the presence of a photosensitizer (see EP 0 168 713 B1 or DE 38 20 294 C1). Likewise possible for use are compositions in which the crosslinking reaction between organopolysiloxanes which have mercapto-group-substituted hydrocarbon attached directly to the silicon atoms, and organopolysiloxanes having vinyl groups attached directly to the silicon atoms, is induced in the presence of a photosensitizer. Compositions of this kind are described in U.S. Pat. No. 4,725,630 A1, for example.

When use is made of the organopolysiloxane compositions, as described in DE 33 16 166 C1, for example, which have hydrocarbon radicals substituted by epoxy groups and attached directly to the silicon atoms, the crosslinking reaction is induced by release of a catalytic amount of acid, which is obtained by photo-decomposition of added onium salt catalysts. Other organopolysiloxane compositions curable by a cationic mechanism are materials which have, for example, propenyloxysiloxane end groups.

Of the silicones identified, the greatest economic importance is possessed by the addition-crosslinking (hydrosilylation-curing) silicones. One unwanted property of these systems, however, is their sensitivity toward catalyst poisons, such as heavy metal compounds, sulfur compounds, and nitrogen compounds, for example (in this regard, cf. "Chemische Technik, Prozesse and Produkte" by R. Dittmeyer et al., volume 5, 5th edition, Wiley-VCH, Weinheim, Germany, 2005, section 6-5.3.2, pages 1142). It is generally the case that electron donors can be considered to be platinum poisons (A. Colas, Silicone Chemistry Overview, Technical Paper, Dow Corning). The result of the presence of catalyst poisons is that the crosslinking reaction between the different constituents of a silicone release varnish no longer takes place or takes place only to a low extent.

In the preparation of antiadhesive silicone coatings, therefore, the presence of catalyst poisons, particularly of platinum poisons, is stringently avoided.

The practical application of the stated antiadhesive silicone coatings, however, exhibits a number of disadvantages.

For instance, the level of the removal force of a PSA from a silicone release liner is adjusted typically through silicone-MQ resins (silicone-methylsilicone-rubber resins). Depending on the requirement for the product, a different level is required for the removal forces. This makes it necessary to use, and therefore also to stock, a plurality of release liners with differing MQ resin contents.

Furthermore, release liners often cannot be used immediately after production, since the properties of the liner have not yet achieved a constant level. This is evident in particular from measurements of the release forces. These forces generally fall in the first days and weeks after production, until they reach a constant level. The effect is called "post-curing" or aftercrosslinking. The time between production of the release liner and coating with PSA is referred to, correspondingly, as post-curing time, aftercrosslinking time or else maturation time. Depending on the requirement relating to the release liner, and on the PSA used on the release liner, the maturation time may amount to several weeks. Because of the required maturation time, the release liners produced have to be stored, giving rise to storage costs.

A further problem emerges from the occasional observation during storage of an increase in the removal forces in the case of laminates of release liners with PSAs. To the skilled person, this effect is known as "adhesive lock-up" or, specifically in respect of acrylates, as "acrylic lock-up". In certain circumstances, this effect means that the release liner is difficult if not impossible to remove from the PSA subsequently, meaning that the product becomes unusable.

It is an object of the invention to prevent or at least reduce the disadvantages of the prior art. It is desirable more particularly
- to be able to set different removal forces between an acrylate-based PSA, located on a liner furnished with a silicone coating, and that liner, without effecting the bond strength of the PSA,
- to shorten the required maturation time prior to the use of the release liner, and/or
- to prevent acrylic lock-up.

SUMMARY OF THE INVENTION

This object is achieved by means of an acrylate-based pressure-sensitive adhesive admixed with additives which act as catalyst poisons for hydrosilylation catalysts (crosslinking catalysts in the case of addition-crosslinking silicone systems). Such crosslinking catalysts comprise, for example, ruthenium, rhodium, palladium, osmium, indium or, in particular, platinum, their complexes and compounds, and/or catalyst systems composed of two or more of these catalysts. Selected with particular preference are catalyst poisons which are active for frequent hydrosilylation catalysts such as chloroplatinic acid, platinum acetylacetonate, complexes of platinum(II) halides with unsaturated compounds—such as ethylene, propylene, organovinylsiloxanes, and styrene, for example—, hexamethyldiplatinum, $PtCl_2PtCl_3$, $Pt(CN)_3$.

DETAILED DESCRIPTION

Use is made in particular of additives which act as catalyst poisons for platinum-containing catalysts. Especially suitable for this purpose are sulfur-, nitrogen- and/or phosphorus-containing compounds which act as catalyst poisons for platinum-containing catalysts.

Where reference is made as part of this specification to acrylate-based pressure-sensitive adhesives or PSAs, the term should be taken—even without explicit mention—to encompass PSAs based on methacrylates and based on acrylates and methacrylates, unless expressly described otherwise.

The invention relates accordingly to an adhesive tape comprising at least one layer of an acrylate-based pressure-sensitive adhesive, and a liner furnished with a silicone coating, the silicone coating being in direct contact with the layer of pressure-sensitive adhesive, and the pressure-sensitive adhesive having been admixed with additives—more particularly in the form of sulfur-, nitrogen- and/or phosphorus-containing compounds—which act as catalyst poisons for hydrosilylation catalysts (catalysts active for the addition crosslinking of silicones)—more particularly for platinum-containing catalysts.

The expression "regulating the removal forces" in this context embraces the adjusting of the removal forces to a particular level, the reducing of the maturation time, in other words the time between production of the release liner and contacting with the layer of pressure-sensitive adhesive (that is, the temporal adjustment of the release forces to a value suitable for the application), and also the prevention of reactions between the PSA and the silicone (that is, the prevention of the relevant aging of the system, and hence the alteration of the removal forces over time). The identified use, accordingly, includes all processes which produce at least one, more preferably all, of the stated effects.

Catalyst poisons are compounds which coat the surface of a catalyst and thereby, temporarily or permanently, lessen its effect or even eliminate its effect entirely—compounds, in other words, which on contact with catalysts deactivate them.

Catalyst poisons, more particularly platinum poisons, used in accordance with the invention are preferably one or more compounds selected from the following compilation:

Amines (e.g., triethylamine, melamine, triethanolamine),
Amides (e.g., dimethylformamide),
Cyanates,
Nitriles (e.g., adiponitrile),
Oximes (e.g., 2-butoxime),
Nitroso compounds (e.g., alpha-nitroso-beta-naphthol),
Chelates (e.g., EDTA—ethylenediaminetetraacetate, NTA—nitriloacetic acid),
Oxazolines (e.g., 1,4-bisoxazolinylbenzene),
Thio compounds (e.g., thioacetic acid, allylthiourea, dodecyl mercaptan, didodecyl 3,3'-thiopropionate),
Disulfides (e.g., dibenzyl disulfide),
Tin salts (e.g., those of the kind employed in tin-catalyzed silicone release coatings),
Phosphines (e.g., triphenylphosphine),
Phosphites (e.g., triphenyl phosphite),
Arsenic compounds (e.g., triphenylarsine),
Antimony compounds (e.g., triphenylstibane),
Selenides (e.g., diphenyl selenide).

As catalyst poisons it is additionally possible to use non-aromatic heterocycles having a free electron pair.

Catalyst poisons, more particularly platinum poisons, which can be used with particular preference in accordance with the invention are selected from the compilation comprising the following substances:

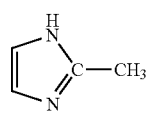

Dyhard MI-C
2-Methyl-1H-imidazole
CAS: 693-98-1

-continued

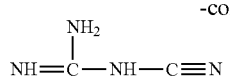
Dyhard 100S
Dicyandiamide
CAS: 461-58-5

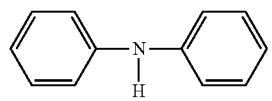
Diphenylamine
CAS: 122-39-4

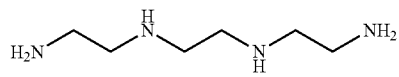
Triethylenetetramine
CAS: 112-24-3

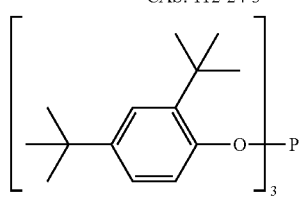
Irgafos 168
Tris(2,4-di-tert-butylphenyl) phosphite
CAS: 31570-04-4

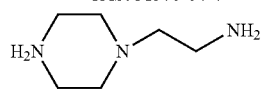
N-(2-Aminoethyl)piperazine
CAS: 140-31-8

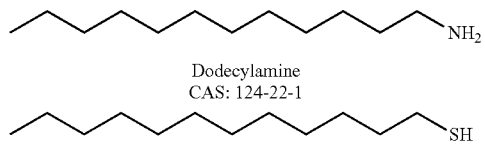
Dodecylamine
CAS: 124-22-1

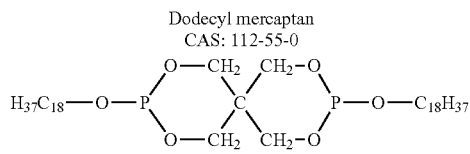
Dodecyl mercaptan
CAS: 112-55-0

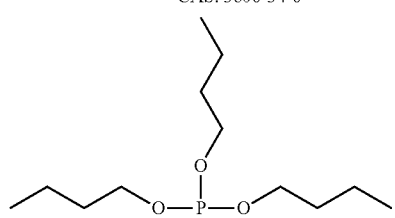
Weston 618 F
Distearyl Pentaerythritol Diphosphite
CAS: 3806-34-6

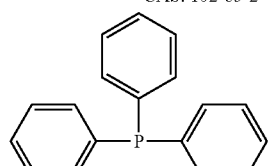
Tributyl phosphite
CAS: 102-85-2

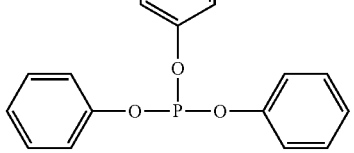
Triphenylphosphine
CAS: 603-35-0

-continued

Triphenyl phosphite
CAS: 101-02-0

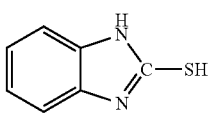
1,4-Bisoxazolinylbenzene

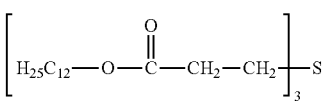
Merbol
CAS: 00633-9

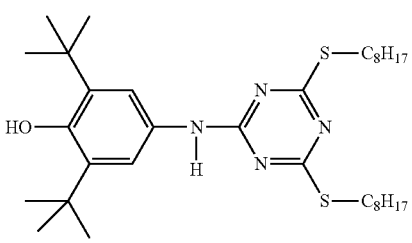
Irganox PS 800
Didodecyl 3,3'-thiopropionate
CAS: 123-28-4

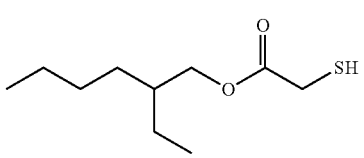
Irganox 565
2,4-Bis-(n-octylthio)-6-(4-hydroxy-3,5-di-tert-butyl-anilino)-1,3,5-triazine
CAS: 991-84-4

CAS: 25103-09-7
2-Ethylhexyl thioglycolat

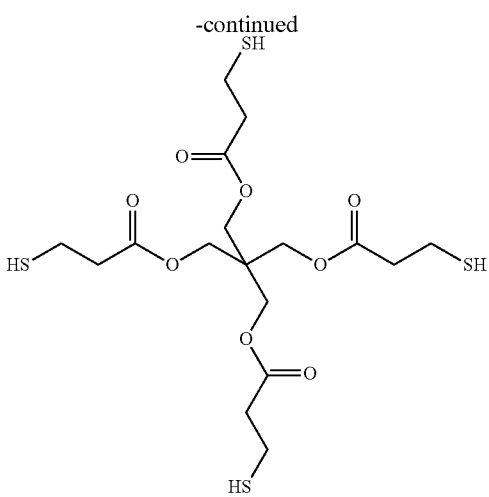

CAS: 231-472-8
Pentaerythritol tetra(3-mercaptopropionate)

The compounds that are active as catalyst poisons in the pressure-sensitive adhesive are used preferably in an amount of up to 10% by weight, more preferably from 0.0001% to 5% by weight, very preferably 0.001% to 1% by weight.

Via the amount of platinum poison added it is possible directly to set the removal forces of the adhesive layer from the release liner. Hence—depending on the activity of the complexing effect of the platinum poison—small amounts of platinum poison, i.e., for instance in the region of up to 0.01% by weight, more particularly in the range from 0.0008% to 0.0065% by weight result in good removability but still with relatively high removal forces, with a temporal stability that is already good.

For setting in the range of moderate removal forces, it is advantageous to raise the amount of platinum poison in the pressure-sensitive adhesive, for instance to a range from 0.005% to 0.1% by weight, more particularly from 0.008% to 0.065% by weight.

If the desire is to reduce the removal forces still further, then an advantageously selected amount of platinum poison in the pressure-sensitive adhesive is from 0.05% to 1% by weight, more particularly from 0.08% to 0.65% by weight. By this means it is possible to achieve a further substantial reduction in the removal forces, and the effect in relation to acrylic lock-up is found to be particularly good.

A very advantageous procedure, especially in the case of low quantities of platinum poison, is when the additized pressure-sensitive adhesive is applied rapidly to the freshly produced liner, and the pressure-sensitive adhesive is crosslinked rapidly, particularly at elevated temperature.

A particular effect of the presence of catalyst poisons, particularly platinum poisons, is that a catalyzed (particularly platinum-catalyzed) crosslinking reaction between the carboxyl groups of the acrylate PSA and the Si—H groups of the silicone crosslinker, present in the release liner, is partly or wholly prevented. In other words, by means of the catalyst poisons, more particularly platinum poisons, it is possible to influence the reactions at the silicone/PSA interface. The higher the fraction of the platinum-poisoning compounds, the greater the extent to which the reaction between PSA and silicone coating is hindered, with the consequence of a reduction in the removal forces of the liner from the acrylate-based PSAs.

The acrylate-based PSA of the invention comprises at least one polyacrylate. This is a polymer which is obtainable by free-radical polymerization of acrylic monomers, a term which also comprehends methylacrylic monomers, and optionally of further, copolymerizable monomers.

The polyacrylate is preferably one which is crosslinkable with epoxide groups or with oxetane groups. Monomers or comonomers used with preference, accordingly, are functional monomers which are crosslinkable with epoxide groups or with oxetane groups; employed here more particularly are monomers with acid groups (especially carboxylic acid, sulfonic acid or phosphonic acid groups) and/or hydroxyl groups and/or acid anhydride groups and/or epoxide groups and/or amino groups; monomers containing carboxylic acid groups are preferred. It is especially advantageous if the polyacrylate contains copolymerized acrylic acid and/or methacrylic acid.

Other monomers which can be used as comonomers for the polyacrylate are, for example, acrylic and/or methacrylic esters having up to 30 C atoms, vinyl esters of carboxylic acids containing up to 20 C atoms, vinyl-aromatics having up to 20 C atoms, ethylenically unsaturated nitriles, vinyl halides, vinyl ethers of alcohols containing 1 to 10 C atoms, aliphatic hydrocarbons having 2 to 8 C atoms and one or two double bonds, or mixtures of these monomers.

For the process of the invention it is preferred to use a polyacrylate which on the following reactant mixture, comprising, in particular, softening monomers, additionally monomers with functional groups capable of entering into reactions with the epoxy groups or oxetane groups, more particularly addition reactions and/or substitution reactions, and also, optionally, further copolymerizable comonomers, more particularly hardening monomers. The nature of the polyacrylate to be prepared (pressure-sensitive adhesive; heat-sealing composition, viscoelastic nontacky material, and the like) may be influenced in particular via a variation in the glass transition temperature of the polymer, through different weight fractions of the individual monomers.

For purely crystalline systems there is a thermal equilibrium between crystal and liquid at the melting point $T_m$. Amorphous or partially crystalline systems, in contrast, are characterized by the transformation of the more or less hard amorphous or partially crystalline phase into a softer (rubber-like to viscous) phase. At the glass point, particularly in the case of polymeric systems, there is a "thawing" (or "freezing" in the case of cooling) of the Brownian molecular motion of relatively long chain segments.

The transition from the melting point $T_m$ (also "melting temperature"; really defined only for purely crystalline systems; "polymer crystals") to the glass transition point $T_g$ (also "glass transition temperature", "glass temperature") can therefore be considered to be a fluid transition, depending on the proportion of the partial crystallinity of the sample under analysis.

In the sense of the remarks above, when the glass transition point is stated, the reference for the purposes of this specification includes the melting point as well—in other words, the glass transition point (or else, synonymously, the glass transition temperature) is also understood to include the melting point for the corresponding "melting" systems. The statements of the glass transition temperatures relate to the determination by means of dynamic mechanical analysis (DMA) at low frequencies.

In order to obtain polymers, as for example pressure-sensitive adhesives or heat-sealing compositions, having desired glass transition temperatures, the quantitative composition of the monomer mixture is advantageously selected such that, in accordance with an equation (E1) in analogy to the Fox equation (cf. T. G. Fox, Bull. Am. Phys. Soc. 1 (1956) 123), the desired $T_g$ value for the polymer is produced.

$$\frac{1}{T_g} = \sum_n \frac{W_n}{T_{g,n}} \qquad (E1)$$

In this equation, n represents the serial number of the monomers used, $W_n$ represents the mass fraction of the respective monomer n (% by weight), and $T_{g,n}$ represents the respective glass transition temperature of the homopolymer of each of the monomers n, in K.

It is preferred to use a polyacrylate which can be traced back to the following monomer composition:
a) acrylic and/or methacrylic esters of the following formula

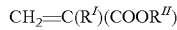

where $R^I$=H or $CH_3$ and $R^{II}$ is an alkyl radical having 4 to 14 C atoms,
b) olefinically unsaturated monomers having functional groups of the type already defined for reactivity with epoxide groups or oxetane groups,
c) optionally further acrylates and/or methacrylates and/or olefinically unsaturated monomers which are copolymerizable with component (a).

For the use of the polyacrylate as a PSA, the fractions of the corresponding components (a), (b), and (c) are selected such that the polymerization product more particularly has a glass transition temperature ≤15° C. (DMA at low frequencies).

For the preparation of PSAs it is very advantageous to select the monomers of component (a) with a fraction from 45% to 99% by weight, the monomers of component (b) with a fraction from 1% to 15% by weight, and the monomers of component (c) with a fraction from 0% to 40% by weight (the figures are based on the monomer mixture for the "base polymer", i.e., without additions of any additives to the completed polymer, such as resins etc.).

For the application of a hotmelt adhesive, in other words of a material which acquires its pressure-sensitive tack only by virtue of heating, the fractions of the corresponding components (a), (b), and (c) are selected more particularly such that the copolymer has a glass transition temperature ($T_g$) of between 15° C. and 100° C., preferably between 30° C. and 80° C., more preferably between 40° C. and 60° C. The fractions of components (a), (b), and (c) should be selected accordingly.

A viscoelastic material, which, for example, may typically be laminated on both sides with pressure-sensitive adhesive layers, has a glass transition temperature ($T_g$) in particular of between −50° C. to +100° C., preferably between −20° C. to +60° C., more preferably 0° C. to 40° C. Here again, the fractions of components (a), (b), and (c) should be selected accordingly.

The monomers of component (a) are, in particular, softening and/or apolar monomers.

For the monomers (a) it is preferred to use acrylic monomers which comprise acrylic and methacrylic esters with alkyl groups consisting of 4 to 14 C atoms, preferably 4 to 9 C atoms. Examples of monomers of this kind are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as 2-ethylhexyl acrylate, 2-ethylhexyl methacrylate, for example.

The monomers of component (b) are, in particular, olefinically unsaturated monomers (b) having functional groups, in particular having functional groups which are able to enter into a reaction with the epoxide groups.

Preference for component (b) is given to using monomers having those functional groups which are selected from the following listing: hydroxyl, carboxyl, sulfonic acid or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinyl-phosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

For the purposes of component (c) it is possible in principle to use all compounds with vinylic functionalization which are copolymerizable with component (a) and/or component (b), and which may also serve to adjust the properties of the resultant PSA.

Monomers named by way of example for component (c) are as follows:
methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, t-butylphenyl acrylate, t-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethyl-acrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, dimethylaminopropylacrylamide, dimethylaminopropylmethacrylamide, N-(1-methylundecyl) acrylamide, N-(n-butoxy-methyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamide, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinyl-phthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyrene-ethyl methacrylate (molecular weight $M_w$ from 4000 to 13 000 g/mol), poly(methyl methacrylate)ethyl methacrylate ($M_w$ from 2000 to 8000 g/mol).

Monomers of component (c) may advantageously also be selected such that they contain functional groups which support subsequent radiation crosslinking (by electron beams, UV, for example). Suitable copolymerizable photoinitiators are, for example, benzoin acrylate monomers and acrylate-functionalized benzophenone derivative monomers which support crosslinking by electron irradiation, examples being tetrahydrofurfuryl acrylate, N-tert-butylacrylamide, and allyl acrylate, this enumeration not being conclusive.

Preparation of the Polymers

The polyacrylates may be prepared by the processes familiar to the skilled person, with particular advantage by conventional free-radical polymerizations or controlled free-radical polymerizations. The poly-acrylates may be prepared by copolymerization of the monomeric components using the usual polymerization initiators and also, where appropriate, regulators, with polymerization taking place at the customary temperatures in bulk, in emulsion, such as in water or liquid hydrocarbons, for example, or in solution.

The polyacrylates are prepared preferably by polymerization of the monomers in solvents, more particularly in solvents with a boiling range from 50 to 150° C., preferably from 60 to 120° C., using the customary amounts of polymerization initiators, these generally being 0.01% to 5%, more particularly 0.1% to 2%, by weight (based on the total weight of the monomers). Suitable in principle are all customary initiators that are familiar to the skilled person for acrylates. Examples of free-radical sources are peroxides, hydro-peroxides, and azo compounds, e.g., dibenzoyl peroxide, cumene hydroperoxide, cyclohexanone peroxide, di-tert-butyl peroxide, cyclohexylsulfonyl acetyl peroxide, diisopropyl percarbonate, tert-butyl peroctoate, benzopinacol. In one very preferred procedure, use is made as free-radical initiator of 2,2'-azobis(2-methyl-butyronitrile) (Vazo® 67™ from DUPONT) or 2,2'-azobis-(2-methylpropionitrile) (2,2'-azobisisobutyronitrile; AIBN; Vazo® 64™ from DUPONT).

Solvents contemplated include alcohols, such as methanol, ethanol, n- and iso-propanol, n- and iso-butanol, preferably isopropanol and/or isobutanol; and also hydrocarbons such as toluene and, in particular, benzines with a boiling range from 60 to 120° C. It is possible in particular to use ketones, such as, preferably, acetone, methyl ethyl ketone, methyl isobutyl ketone, and esters, such as ethyl acetate, and also mixtures of solvents of the stated type, with preference going to mixtures containing isopropanol, particularly in amounts of 2% to 15% by weight, preferably 3% to 10% by weight, based on the solution mixture used.

The weight-average molecular weights $M_w$ of the polyacrylates are situated preferably within a range from 20 000 to 2 000 000 g/mol; very preferably within a range from 100 000 to 1 000 000 g/mol, and extremely preferably in a range from 150 000 to 500 000 g/mol. The figures for the average molecular weight $M_w$ and for the polydispersity PD in this specification relate to the determination by gel permeation chromatography. For this purpose it may be advantageous to carry out the polymerization in the presence of suitable polymerization regulators such as thiols, halogen compounds and/or alcohols, in order to set the desired average molecular weight.

The polyacrylate preferably has a K value of 30 to 90, more preferably of 40 to 70, as measured in toluene (1% strength solution, 21° C.). The K value according to FIKENTSCHER is a measure of the molecular weight and viscosity of the polymer.

Particularly suitable for the process of the invention are polyacrylates which have a narrow molecular weight distribution (polydispersity PD<4). In spite of a relatively low molecular weight, these compositions, after crosslinking, have a particularly good shear strength. Moreover, the lower molecular weight allows easier processing from the melt, since the flow viscosity is lower as compared with a broader-range polyacrylate, with largely the same application properties. Narrow-range polyacrylates may be prepared, advantageously, by anionic polymerization or by controlled free-radical polymerization methods, the latter being especially suitable. Examples of poly-acrylates of this kind which are prepared by the RAFT process are described in U.S. Pat. No. 6,765,078 B2 and U.S. Pat. No. 6,720,399 B2. Polyacrylates of this kind can also be prepared via N-oxyls, as described in EP 1 311 555 B1, for example. Atom Transfer Radical Polymerization (ATRP) as well can be employed advantageously for the synthesis of narrow-range polyacrylates, in which case it is preferred as initiator to use monofunctional or difunctional, secondary or tertiary halides and, for abstracting the halide(s), complexes of Cu, Ni, Fe, Pd, Pt, Ru, Os, Rh, Co, Ir, Ag or Au (cf. for example, EP 0 824 111 A1; EP 826 698 A1; EP 824 110 A1; EP 841 346 A1; EP 850 957 A1). The various possibilities of ATRP are further described in specifications U.S. Pat. No. 5,945,491 A, U.S. Pat. No. 5,854,364 A and U.S. Pat. No. 5,789,487 A.

The polyacrylates obtainable by the process of the invention can also be admixed, prior to thermal crosslinking, with at least one tackifying resin. Tackifying resins for addition and suitable for use are the existing tackifier resins described in the literature. Reference may be made in particular to all aliphatic, aromatic, and alkylaromatic hydrocarbon resins, hydrocarbon resins based on pure monomers, hydrogenated hydrocarbon resins, functional hydrocarbon resins, and natural resins. With preference it is possible to use pinene resins, indene resins, and rosins, their disproportionated, hydrogenated, polymerized, and esterified derivatives and salts, terpene resins and terpene-phenolic resins, and also C5 resins, C9 resins, and other hydrocarbon resins. Combinations of these and further resins may also be used with advantage in order to adjust the properties of the resultant PSA in accordance with what is desired. With particular preference it is possible to use all resins that are compatible (soluble) with the polyacrylate in question. In one particularly preferred procedure, terpene-phenolic resins and/or rosin esters are added.

Optionally it is also possible for powder and granular fillers, dyes and pigments, especially including abrasive and reinforcing types, such as chalk ($CaCO_3$), for example, titanium dioxides, zinc oxides, and carbon blacks, to be incorporated into the polyacrylate solution.

Furthermore, fillers of low flammability, electrically conductive fillers (such as conductive carbon black, carbon fibers and/or silver-coated beads, for example), and also thermally conductive materials, and also ferromagnetic additives, and also additives for increasing volume, especially for the production of foamed layers (such as, for example, expandants, solid glass beads, hollow glass beads, microbeads made of other materials, expandable microballoons, silica, silicates, organically renewable raw materials, such as wood flour, for example, organic and/or inorganic nanoparticles, and fibers), may be added or incorporated by compounding.

Additionally it is possible for inorganic and/or organic colorants (in the form of pastes, compounded formulations or pigments), ageing inhibitors, light stabilizers, ozone protectants, compounding agents and/or expandants, to be added or incorporated by compounding, before or after the concentration of the polyacrylate.

The customary plasticizers (plasticizing agent) may optionally be added, particularly in concentrations of up to 5% by weight.

In addition, optionally, the polyacrylate may also be blended or mixed with other polymers. Polymers suitable for this purpose include polymers based on natural rubber, synthetic rubber, EVA, silicone rubber, acrylic rubber, polyvinyl ether.

In accordance with the invention, the release liner is furnished with a silicone coating. The silicone coating provided on the liner preferably comprises an addition-crosslinking silicone.

Particularly advantageous silicones are elucidated in more detail below.

The silicone-based release coatings used in accordance with the invention are those on an addition-crosslinking basis, in other words those which can be cured—thermally in particularly—by hydrosilylation. These release systems typically comprise the following constituents: an alkenylated polydiorganosiloxane (in particular, linear polymers with terminal alkenyl groups), a polyorganohydrosiloxane crosslinking agent, and a hydrosilylation catalyst, especially of the type identified above.

Thermally curing release coatings that are advantageous in accordance with the invention and are based on addition-crosslinking silicones are frequently multi-component systems, consisting typically of the following components:

a) A linear or branched polydimethylsiloxane which is composed of around 80 to 200 dimethylsiloxane units and is terminated at the chain ends with vinyldimethylsiloxy units, or a linear polydimethylsiloxane which is composed of around 80 to 200 dimethylsiloxane units and around 1 to 10 methylvinylsiloxane units and also is terminated at the chain ends with vinyldimethylsiloxy units. Typical representatives are, for example, solvent-free, addition-crosslinking silicone oils, such as DEHESIVE® 920, 912 or 610, all available commercially from Wacker-Chemie GmbH, or such as SYL-OFF® SL 9104, available commercially from Dow Corning GmbH.

b) A linear, cyclic or branched crosslinker or any desired mixture thereof, the crosslinker being composed typically of methylhydrosiloxy and dimethylsiloxy units or only of methylhydrosiloxy units, and the chain ends being satisfied either with trimethylsiloxy groups or dimethylhydrosiloxy groups. Typical representatives of this class of product are, for example, hydropolysiloxanes with high reactive Si—H content, such as the crosslinkers V24, V90 or V06, which are available commercially from Wacker-Chemie GmbH, or the crosslinker SYL-OFF® 7689, available commercially from Dow Corning GmbH.

c) A silicone-MQ resin, possessing vinyldimethylsiloxy units as M unit in addition to the trimethylsiloxy units typically used. Typical representatives of this group are, for example, the release-force regulators CRA® 17 or CRA® 42, available commercially from Wacker-Chemie GmbH, or SYL-OFF® SL 9154, available commercially from Dow Corning GmbH.

d) A silicone-soluble platinum catalyst such as, for example, a platinum-divinyltetramethyldisiloxane complex, which is typically referred to as Karstedt complex and is commercially available, for example, under the designation Catalyst OL from Wacker-Chemie GmbH or under the designation SYL-OFF® 4000 from Dow Corning GmbH.

Additionally suitable are compositions of the kind described, for example, in the abovementioned DE 600 01 779 T2, particularly claim 12 therein, and also in paragraphs [0036] to [0050]. These release systems are systems which crosslink by addition reaction, specifically by temperature treatment of a mixture of an organopolysiloxane having hydrogen atoms attached directly to the silicon atoms and an organopolysiloxane having vinyl groups attached directly to the silicon atoms, in the presence of a hydrosilylation catalyst.

The silicones are applied to the carrier and thus form a continuous silicone coating.

Papers or films may be used as the carrier material of the liner. Films used in this context are polyolefin films (polypropylene films and polyethylene films) or polyester films.

The invention further provides for the use of compounds which act as catalyst poisons for hydrosilylation catalysts in an acrylate-based pressure-sensitive adhesive which is located on a liner furnished with a silicone coating, for the purpose of regulating the removal forces with which the liner can be removed from the pressure-sensitive adhesive.

As described above, hydrosilylation catalysts of this kind are frequently platinum-based catalysts. Particularly in accordance with the invention, therefore, is the use of compounds which act as catalyst poisons for platinum-containing catalysts—especially hydrosilylation catalysts—in an acrylate-based pressure-sensitive adhesive which is located on a liner furnished with a silicone coating, for the purpose of regulating the removal forces with which the liner can be removed from the adhesive.

The invention relates, finally, to the use of the acrylate PSA of the invention in an adhesive tape.

In the text below, the invention is elucidated in more detail with reference to examples, without any intention that these examples should have a restricting effect in any form at all.

EXAMPLES

General Procedure

Preparation of the Release Liners

A crosslinkable silicone composition consisting of 70 parts of Dow Corning SYL-OFF® SL 9104, 30 parts of Dow Corning SYL-OFF® SL 9154, 8.9 parts of Dow Corning SYL-OFF® SL 7689, and 1.6 parts of Dow Corning SYL-OFF® 4000 was applied to a PET film (Lumirror 60.01, 75 µm, Toray), using a #1 doctor, from 30% solution in benzine. The silicone was crosslinked at 150° C. for 30 seconds. The application of silicone was adjusted to 1.3 g/m².

Preparation of the Base PSA Modified in Each Example

In a free-radical polymerization in a conventional 200 l reactor, 0.7 kg of acrylic acid, 33.95 kg of 2-ethylhexyl acrylate, 33.95 kg of butyl acrylate, 1.4 kg of glycidyl methacrylate, and 23.35 kg of special-boiling-point spirit 60/95 and also 23.35 kg of acetone, were introduced. After nitrogen gas had been passed through the reaction solution with stirring for 45 minutes, the reactor was heated to 58° C. and 0.07 kg of Vazo 67™ (DuPont) in solution in 0.35 kg of acetone was added. Subsequently the external heating bath was heated to 75° C. and the reaction was carried out constantly at this external temperature. After a reaction time of 1 hour, 0.07 kg of Vazo 67™ (DuPont) in solution in 0.35 kg of acetone was added. After a reaction time of 2.5 hours, 0.091 kg of dicyclohexyl peroxydicarbonate (Perkadox 16®, Akzo Nobel) was added. After a reaction time of 3.5 hours, 10.50 kg of special-boiling-point spirit 60/95 was added for dilution. Further dilution took place after 7.5 hours, with addition of 10.5 kg of special-boiling-point spirit 60/95. After a reaction time of 24 hours, the polymerization was discontinued and the reaction vessel was cooled to room temperature.

The polymer was subsequently blended with 37.5% by weight of Sylvares TP 95 (terpene-phenolic resin having a softening temperature of 95° C.) and 0.3% by weight of $ZnCl_2$ (% by weight based in each case on the polymer).

Preparation of Test Strips Inventive Examples 1-18, Comparative Examples 1-5

A pressure-sensitive adhesive having the composition indicated in the specific example was applied after a release-liner maturation time of two days, unless described differently, to the above-described release liner, with the aid of a coating bar. Following the evaporation of the major part of the solvent, the PSA was dried in a forced-air oven at 120° C. for 15 minutes. A coatweight of 50 g/m² was selected. After the samples had cooled, a PET film 23 μm thick (Polibond D23H, Polifibra Folien GmbH) was laminated onto the PSA. The respective assemblies of release liner, PSA, and 23 μm PET film were cut into strips 2 cm wide.

Preparation of Test Strips Inventive Examples 19-24, Comparative Example 6

A pressure-sensitive adhesive having the composition indicated in the specific example was applied after a release-liner maturation time of two days, to a PET film 23 μm thick (Polibond D23H, Polifibra Folien GmbH) with the aid of a coating bar. Following the evaporation of the major part of the solvent, the PSA was dried in a forced-air oven at 120° C. for 15 minutes. A coatweight of 50 g/m² was selected. Following the acclimatization of the samples to 23±1° C. and 50±5% relative humidity, the above-described release liner was laminated onto the PSA. The respective assemblies of release liner, PSA, and 23 μm PET film were cut as quickly as possible into strips 2 cm wide.

Description of the Measurement for Inventive Examples 1-18, Comparative Examples 1-5

The removal force of the PET film and PSA from the release liner was measured at an angle of 180° with a removal speed of 0.3 m/min, the measurement being carried out at 23±1° C. and at a relative humidity of 50±5%. The measurement of the removal force was about 24 hours after the release paper had been coated with the PSA.

Description of the Measurement for Inventive Examples 19-24, Comparative Example 6

The cut strips were stored for one minute under a pressure of 2 N/cm². The removal force of the PET film and PSA from the release liner was measured at an angle of 180° with a removal speed of 0.3 m/min, the measurement being carried out at 23±1° C. and at a relative humidity of 50±5%. The time between lamination of the liner and measurement of the removal force was always less than five minutes.

In addition, a further measurement of the removal force was carried out following storage of the assemblies of release liner, PSA, and PET film at 70° C. for 30 days.

Comparative Example 1

No further compounds were added to the base PSA. As described in the general part, coating took place after a maturation time of 2 days.

Comparative Example 2

No further compounds were added to the base PSA. Differing from the general description, the release liner was stored for 7 days prior to coating with PSA.

Comparative Example 3

No further compounds were added to the base PSA. Differing from the general description, the release liner was stored for 14 days prior to coating with PSA.

Comparative Example 4

No further compounds were added to the base PSA. Differing from the general description, the release liner was stored for 21 days prior to coating with PSA.

Comparative Example 5

No further compounds were added to the base PSA. Differing from the general description, the release liner was stored for 42 days prior to coating with PSA.

Inventive Example 1a

The base PSA was admixed with 0.16% by weight of dodecylamine.

Inventive Example 1b

The base PSA was admixed with 0.016% by weight of dodecylamine.

Inventive Example 1c

The base PSA was admixed with 0.0016% by weight of dodecylamine.

Inventive Example 2a

The base PSA was admixed with 0.16% by weight of diphenylamine.

Inventive Example 2b

The base PSA was admixed with 0.016% by weight of diphenylamine.

Inventive Example 2c

The base PSA was admixed with 0.0016% by weight of diphenylamine.

Inventive Example 3a

The base PSA was admixed with 0.16% by weight of aminoethylpiperazine.

Inventive Example 3b

The base PSA was admixed with 0.016% by weight of aminoethylpiperazine.

Inventive Example 3c

The base PSA was admixed with 0.0016% by weight of aminoethylpiperazine.

Inventive Example 4a

The base PSA was admixed with 0.13% by weight of triethylenetetraamine.

Inventive Example 4b

The base PSA was admixed with 0.013% by weight of triethylenetetraamine.

Inventive Example 4c

The base PSA was admixed with 0.0013% by weight of triethylenetetraamine.

Inventive Example 5a

The base PSA was admixed with 0.08% by weight of dicyandiamide.

Inventive Example 5b

The base PSA was admixed with 0.008% by weight of dicyandiamide.

Inventive Example 5c

The base PSA was admixed with 0.0008% by weight of dicyandiamide.

Inventive Example 6a

The base PSA was admixed with 0.08% by weight of 2-methyl-1H-imidazole.

Inventive Example 6b

The base PSA was admixed with 0.01% by weight of 2-methyl-1H-imidazole.

Inventive Example 6c

The base PSA was admixed with 0.0011% by weight of 2-methyl-1H-imidazole.

Inventive Example 7a

The base PSA was admixed with 0.19% by weight of meta- and para-bisoxazolinylbenzene.

Inventive Example 7b

The base PSA was admixed with 0.017% by weight of meta- and para-bisoxazolinylbenzene.

Inventive Example 7c

The base PSA was admixed with 0.0017% by weight of meta- and para-bisoxazolinylbenzene.

Inventive Example 8a

The base PSA was admixed with 0.18% by weight of dodecyl mercaptan.

Inventive Example 8b

The base PSA was admixed with 0.018% by weight of dodecyl mercaptan.

Inventive Example 8c

The base PSA was admixed with 0.002% by weight of dodecyl mercaptan.

Inventive Example 9a

The base PSA was admixed with 0.5% by weight of Irganox 565.

Inventive Example 9b

The base PSA was admixed with 0.05% by weight of Irganox 565.

Inventive Example 9c

The base PSA was admixed with 0.005% by weight of Irganox 565.

Inventive Example 10a

The base PSA was admixed with 0.13% by weight of Merbol.

Inventive Example 10b

The base PSA was admixed with 0.012% by weight of Merbol.

Inventive Example 10c

The base PSA was admixed with 0.0013% by weight of Merbol.

Inventive Example 11a

The base PSA was admixed with 0.65% by weight of Weston 618F.

Inventive Example 11b

The base PSA was admixed with 0.065% by weight of Weston 618F.

Inventive Example 11c

The base PSA was admixed with 0.0065% by weight of Weston 618F.

Inventive Example 12a

The base PSA was admixed with 0.45% by weight of Irganox PS 800.

Inventive Example 12b

The base PSA was admixed with 0.045% by weight of Irganox PS 800.

Inventive Example 12c

The base PSA was admixed with 0.0045% by weight of Irganox PS 800.

Inventive Example 13a

The base PSA was admixed with 0.24% by weight of tributyl phosphite.

Inventive Example 13b

The base PSA was admixed with 0.024% by weight of tributyl phosphite.

Inventive Example 13c

The base PSA was admixed with 0.0024% by weight of tributyl phosphite.

Inventive Example 14a

The base PSA was admixed with 0.27% by weight of triphenyl phosphite.

Inventive Example 14b

The base PSA was admixed with 0.031% by weight of triphenyl phosphite.

Inventive Example 14c

The base PSA was admixed with 0.0027% by weight of triphenyl phosphite.

Inventive Example 15a

The base PSA was admixed with 0.24% by weight of triphenylphosphine.

Inventive Example 15b

The base PSA was admixed with 0.026% by weight of triphenylphosphine.

Inventive Example 15c

The base PSA was admixed with 0.0024% by weight of triphenylphosphine.

Inventive Example 16a

The base PSA was admixed with 0.58% by weight of Irgafos 168.

Inventive Example 16b

The base PSA was admixed with 0.057% by weight of Irgafos 168.

Inventive Example 16c

The base PSA was admixed with 0.0056% by weight of Irgafos 168.

Inventive Example 17a

The base PSA was admixed with 0.325% by weight of pentaerythritol tetra(3-mercaptopropionate).

Inventive Example 17b

The base PSA was admixed with 0.033% by weight of pentaerythritol tetra(3-mercaptopropionate).

Inventive Example 17c

The base PSA was admixed with 0.0033% by weight of pentaerythritol tetra(3-mercaptopropionate).

Inventive Example 18a

The base PSA was admixed with 0.14% by weight of 2-ethylhexyl thioglycolate.

Inventive Example 18b

The base PSA was admixed with 0.014% by weight of 2-ethylhexyl thioglycolate.

Inventive Example 18c

The base PSA was admixed with 0.0014% by weight of 2-ethylhexyl thioglycolate.

Table 1 below shows that the addition of phosphites, phosphates, amines, thiols, and thioethers reduces the removal force of the PET film and PSA from the release liner. The higher the concentration of the compounds, the stronger the effect. The removal forces of the comparative example without any platinum poison are the highest. In the case of the sub-examples c (low concentration of platinum poison), the removal forces are in some cases already very close to the value in comparative example 1.

From the series from comparative example 1 through 5 it is evident how the removal force of the release liner from the PSA goes down as the maturation time goes up.

TABLE 1

| Experiment | Removal force [cN/cm] | | |
|---|---|---|---|
| Comparative example 1 | 68 | | |
| Comparative example 2 | 44 | | |
| Comparative example 3 | 26 | | |
| Comparative example 4 | 22 | | |
| Comparative example 5 | 12 | | |
| | Sub-example a | Sub-example b | Sub-example c |
| Inventive example 1 | 26 | 59 | 62 |
| Inventive example 2 | 50 | 57 | 61 |
| Inventive example 3 | 25 | 46 | 47 |
| Inventive example 4 | 14 | 40 | 51 |
| Inventive example 5 | 21 | 39 | 56 |
| Inventive example 6 | 29 | 56 | 62 |
| Inventive example 7 | 19 | 26 | 28 |
| Inventive example 8 | 9 | 15 | 51 |
| Inventive example 9 | 12 | 31 | 58 |
| Inventive example 10 | 14 | 17 | 18 |
| Inventive example 11 | 6 | 9 | 19 |
| Inventive example 12 | 7 | 13 | 45 |
| Inventive example 13 | 7 | 12 | 59 |
| Inventive example 14 | 7 | 10 | 21 |
| Inventive example 15 | 12 | 48 | 54 |
| Inventive example 16 | 7 | 16 | 27 |

TABLE 1-continued

| Experiment | Removal force [cN/cm] | | |
|---|---|---|---|
| Inventive example 17 | 8 | 19 | 39 |
| Inventive example 18 | 10 | 12 | 35 |

Comparative Example 6

No further compounds were added to the base PSA. As described in the general part, lamination of the release liner to the PSA took place after a maturation time of 2 days.

Inventive Example 19

The base PSA was admixed with 0.18% by weight of dodecyl mercaptan.

Inventive Example 20

The base PSA was admixed with 0.19% by weight of meta- and para-bisoxazolinylbenzene.

Inventive Example 21

The base PSA was admixed with 0.45% by weight of Irganox PS 800.

Inventive Example 22

The base PSA was admixed with 0.13% by weight of Merbol.

Inventive Example 23

The base PSA was admixed with 0.65% by weight of Weston 618F.

Inventive Example 24

The base PSA was admixed with 0.27% by weight of triphenyl phosphite.

From table 2 below it is apparent that the removal force of a PSA without platinum poison increases significantly in the course of storage. The addition of a catalyst poison, more particularly a platinum poison, significantly prevents this increase due to storage.

TABLE 2

| Experiment | Removal force, instantaneous [cN/cm] | Removal force after storage at 70° C. for 30 days [cN/cm] |
|---|---|---|
| Comparative example 6 | 7 | 89 |
| Inventive example 19 | 7 | 10 |
| Inventive example 20 | 6 | 12 |
| Inventive example 21 | 7 | 9 |
| Inventive example 22 | 6 | 10 |
| Inventive example 23 | 6 | 8 |
| Inventive example 24 | 6 | 9 |

The catalyst poisons investigated were outstandingly suitable for meeting the object of the invention, without displaying any substantial influence on the suitability of the PSAs for their respective purpose. Catalyst poisons which have emerged as having particularly outstanding suitability are the thio compounds, particularly dodecyl mercaptan, didodecyl 3,3'-thiopropionate, 2-ethylhexyl thioglyconate, and pentaerythritol tetra(3-mercaptopropionate). These compounds show the smallest influence on the technical properties of the adhesive in relation to its particular field of use.

The invention claimed is:

1. An adhesive tape comprising at least one layer of an acrylate-based pressure-sensitive adhesive, and a liner furnished with a catalyzed, hydrosilylation addition-crosslinking silicone coating, the silicone coating being in direct contact with the layer of acrylate-based pressure-sensitive adhesive, wherein the acrylate-based pressure-sensitive adhesive contains additives selected from the group consisting of didodecyl 3,3'-thiopropionate, 2-ethylhexyl thioglyconate, and pentaerythritol tetra(3-mercaptopropionate), which act as catalyst poisons for the hydrosilylation addition crosslinking catalyst of the silicone.

2. The adhesive tape as claimed in claim 1, wherein the hydrosilylation addition-crosslinking catalyst of the silicone is platinum, a platinum complex or a platinum compound.

3. The adhesive tape as claimed in claim 1, wherein the additives which act as catalyst poisons are present in the acrylate-based pressure-sensitive adhesive in an amount of up to 10% by weight.

4. A method for regulating the removal forces with which a liner furnished with a catalyzed hydrosilylation addition crosslinked silicone coating can be removed from an acrylate-based pressure-sensitive adhesive, which comprises including in said acrylate-based pressure-sensitive adhesive compounds selected from the group consisting of didodecyl 3,3'-thiopropionate, 2-ethylhexyl thioglyconate, and pentaerythritol tetra(3-mercaptopropionate) which act as catalyst poisons for the hydrosilylation addition-crosslinking catalyst in said hydrosilylation catalyzed addition crosslinked silicone coating.

5. A method for regulating the removal forces with which a catalyzed hydrosilylation addition crosslinked silicone coated liner can be removed from an acrylate-based pressure-sensitive adhesive located on said liner, which comprises including in said acrylate-based pressure-sensitive adhesive compounds selected from the group consisting of didodecyl 3,3'-thiopropionate, 2-ethylhexyl thioglyconate, and pentaerythritol tetra(3-mercaptopropionate) which act as catalyst poisons for platinum-containing hydrosilylation catalysts.

6. The method of claim 4, wherein the catalyst poisons are present in the acrylate-based pressure-sensitive adhesive in an amount of up to 10% by weight.

7. The adhesive tape of claim 3, wherein the additives which act as catalyst poisons are present in the acrylate-based pressure-sensitive adhesive in an amount of from 0.0001% to 5% by weight.

8. The adhesive tape of claim 7, wherein said additives which act as catalyst poisons are present in the acrylate-based pressure-sensitive adhesive in an amount of 0.001% to 1% by weight.

9. The method of claim 5, wherein the compounds which act as catalyst poisons are present in the acrylate-based pressure-sensitive adhesive in an amount of up to 10% by weight.

* * * * *